(12) United States Patent
Zachariassen et al.

(10) Patent No.: US 7,438,637 B2
(45) Date of Patent: Oct. 21, 2008

(54) METHOD AND SYSTEM FOR GAS STUNNING OF POULTRY FOR SLAUGHTER

(75) Inventors: Jørgen Zachariassen, Mårslet (DK); Poul Kjeldsen, Ebeltoft (DK)

(73) Assignee: Linco Food Systems A/S, Trige (DK)

( * ) Notice: Subject to any disclaimer, the term of this patent is extended or adjusted under 35 U.S.C. 154(b) by 0 days.

(21) Appl. No.: 11/970,697

(22) Filed: Jan. 8, 2008

(65) Prior Publication Data

US 2008/0108289 A1 May 8, 2008

Related U.S. Application Data

(62) Division of application No. 10/543,187, filed on Jan. 9, 2006, now Pat. No. 7,331,848.

(51) Int. Cl.
*A22B 3/00* (2006.01)

(52) U.S. Cl. ............................................. 452/66

(58) Field of Classification Search ............... 452/53, 452/57, 66
See application file for complete search history.

(56) References Cited

U.S. PATENT DOCUMENTS

| | | | | |
|---|---|---|---|---|
| 2,733,477 A * | 2/1956 | Murphy | ........................ | 452/66 |
| 4,037,565 A | 7/1977 | Ledwell, Jr. | | |
| 5,186,677 A * | 2/1993 | Christensen et al. | ........... | 452/66 |
| 5,487,699 A * | 1/1996 | Tyrrell et al. | .................... | 452/66 |
| 5,643,072 A * | 7/1997 | Lankhaar et al. | ............... | 452/66 |
| 5,788,564 A * | 8/1998 | Chamberlain | ................. | 452/66 |
| 5,906,540 A * | 5/1999 | Grandin | ........................ | 452/58 |
| 5,975,029 A * | 11/1999 | Morimoto et al. | ........... | 119/843 |
| 6,126,534 A * | 10/2000 | Jacobs et al. | ................... | 452/66 |
| 6,135,872 A | 10/2000 | Freeland et al. | ................ | 452/66 |
| 6,174,228 B1 | 1/2001 | Grimsland et al. | | |
| 6,454,510 B1* | 9/2002 | Sinn et al. | .................... | 414/393 |
| 6,623,347 B1* | 9/2003 | Grimsland et al. | ............ | 452/57 |
| 6,848,987 B2* | 2/2005 | Draft | ........................... | 452/66 |
| 7,097,552 B2* | 8/2006 | Ovesen et al. | ................. | 452/66 |
| 2002/0015635 A1 | 2/2002 | Sinn et al. | | |

FOREIGN PATENT DOCUMENTS

| | | |
|---|---|---|
| EP | 1 405 564 A1 | 4/2004 |
| GB | 2 285 906 | 8/1995 |
| GB | 2 362 083 | 11/2001 |
| WO | WO 94/27425 | 12/1994 |

\* cited by examiner

*Primary Examiner*—Thomas Price
(74) *Attorney, Agent, or Firm*—Antonelli, Terry, Stout & Kraus, LLP.

(57) ABSTRACT

A method for gas stunning of poultry for slaughter is in which the poultry arrives at the poultry slaughterhouse, for example, in transport crates, where the poultry is subjected to gas after the poultry have been taken out of the transport crates, and where the poultry are conveyed by conveyors (18, 20, 24, 32) successively through a stunning chamber (8). The influence of the stunning gas for stunning of the poultry is adjusted in the stunning chamber by reducing or increasing by adjusting an effective length of at least one conveyor in the stunning chamber (8).

25 Claims, 2 Drawing Sheets

METHOD AND SYSTEM FOR GAS STUNNING OF POULTRY FOR SLAUGHTER

CROSS REFERENCE TO RELATED APPLICATION

This application is a divisional application of U.S. Ser. No. 10/543,187, filed Jan. 9, 2006, now U.S. Pat. No 7,331,848 and the entire disclosure of which is hereby incorporated by reference.

FIELD OF THE INVENTION

The present invention relates to a method for gas stunning of poultry.

BACKGROUND OF THE INVENTION

Over time, many different methods have been proposed for gas stunning of poultry arriving at the poultry slaughterhouse in transport crates, with no remarkable success. In practice however, several parameters must be considered in order to be able to optimize a method for gas stunning of poultry for slaughter.

To optimize the method, the following parameters must be considered:
Conveying speed (capacity of the system).
Size and number of birds in the transport crates.
The physical condition of the poultry flock which is determined by continuously observing variations in stress condition or resistance of the poultry which are significant for determining the time necessary for stunning the poultry which further may vary because of conditions in broiler houses, temperatures, transport time, and waiting time in the slaughterhouse.

To optimize the gas stunning it is furthermore necessary to be able to continuously consider all these parameters prior to and during gas stunning of the poultry supplies delivered to the slaughterhouse, and continuously apply the most advantageous parameters to achieve optimum gas stunning of the actual chicken flock at any time to be stunned and slaughtered, respectively.

To optimize these parameters, different periods of stunning time can be applied, but variations in the gas concentration, and variations of gas concentration in the different sections of the conveying route must also be considered, dependent on the conveying route length and conveying route location in the stunning chamber.

The gas concentration may be monitored and controlled by means of sensors having different locations, and a PLC control system. Adjustment of the stunning time and simultaneous variation of the gas concentration require a change in the previously used methods by which a given slaughtering capacity of number of birds per minute required a fixed conveying time through stunning chamber. A given rate of slaughtering (slaughtering capacity) will always be determined by other subsequent parameters that cannot be changed right away why they are maintained. Consequently it may furthermore be necessary to be able to change the degree of stunning, depending on the condition of the poultry upon arrival at the slaughterhouse and unloading for slaughter.

SUMMARY OF THE INVENTION

On this background it is the purpose of the invention to provide an improved method for gas stunning of poultry for slaughter, which method by means of simple provisions and means makes it possible to optimize the stunning by being able to allow for all the parameters mentioned above.

The method according to the invention adjusts the influence of the gas for stunning of the animals by reducing or prolonging the conveying time and/or the active conveying route length of the animals on said conveyors through the stunning chamber. It has surprisingly appeared that by means of such simple provisions it is possible to optimize the stunning, while at the same time allowing for all the parameters mentioned. As an especially important thing it should be mentioned that at the same time it is possible to consider the welfare of the animals by observing the stunning condition of the animals before they reach the actual slaughter. If the stunning condition of the animals is not optimum, it will be easy to prolong or reduce the conveying time and/or the conveying route through the stunning chamber.

An optimum condition of stunning will be that the animals are so well stunned that with certainty they do not awaken before they reach slaughtering. On the other hand it is also important that the animals do not die in stunning because it is important that the pumping function of the heart is maintained in order to contribute to the pumping out of blood when the necks of the animals are cut in the actual slaughter.

Appropriately, by the invention a method is used by which the adjustment of the conveying time through the stunning chamber is effected by increasing or reducing the speed of the said conveyors.

By the method according to the invention it may furthermore be advantageous that the adjustment of the conveying route through the stunning chamber is effected by reducing or prolonging the active conveyor runs of the respective conveyors.

Furthermore, the method according to the invention may be modified such that the influence of the gas for stunning of the animals moreover is adjusted by varying the gas concentration at varying heights in the stunning chamber in that increasing gas concentration is applied in a direction downwards in the stunning chamber The invention furthermore relates to a system for gas stunning of poultry for slaughter comprising a substantially horizontal conveyor arranged for receiving and introducing poultry for slaughter to a gas-filled stunning chamber in which a downwards running conveyor is arranged, which conveyor is arranged for successively conveying the poultry downwards in the stunning chamber, and an upwards running conveyor arranged for successively conveying the poultry upwards and out of the stunning chamber, wherein the downwards running conveyor either has a conveyor having a downwards running course and a horizontal course, the downwards running conveyor, comprising mutually interacting telescopic members for adjustment of the active conveying route length, or are constituted by a helical conveyor interacting with a horizontal, telescopic conveyor.

Preferably, the system according to the invention is provided such that the upwards running conveyor is constituted by conveyors having mutually interacting telescopic members, namely, a horizontal conveyor and an upwards running conveyor having a slanting course.

Appropriately, the system according to the invention is provided such that the stunning chamber is divided into a number of horizontal zones, for example, a lower zone having a gas concentration ($CO_2$) of approximately 45-51%, an intermediate zone having a gas concentration ($CO_2$) of 25% to approximately 32%-46%, and an upper zone having a gas concentration ($CO_2$) of 5% to approximately 8%-10%. Sensors are provided with the upper zone limits for monitoring and control respectively of the gas concentration in the zones.

The actual gas concentration percentage varies a great deal in connection with shift between stopping and operation, and upon a changed rate of motion of the. This variation in gas concentration has relatively small influence on the stunning result, whereas the time of presence, especially in the first zone, and the total time of presence in the stunning chamber have great influence.

The system according to the invention is preferably provided such that it comprises a PLC control system for controlling a number of mutually dependent mechanical parameters, for example speed of conveyors, setting (17.6 meters/minute), number of birds (chickens) on conveyors, speed of slaughtering line, setting (148 birds/minute).

If one setting is changed, the other settings are changed correspondingly, for example if the birds are larger, it means that there are fewer animals on the conveyors, but the speed of the slaughtering line continues to be the same. Consequently it becomes necessary to convey more animals per minute through the stunning chamber, that is, increased conveying speed. At the same time each individual bird is larger which is why it is stunned for a longer time, is longer conveying time and conveying route length respectively are required. through the stunning chamber.

BRIEF DESCRIPTION OF THE DRAWINGS

The invention is explained in more detail below with reference to the drawing in which.

DETAILED DESCRIPTION OF THE INVENTION

Figure 1:
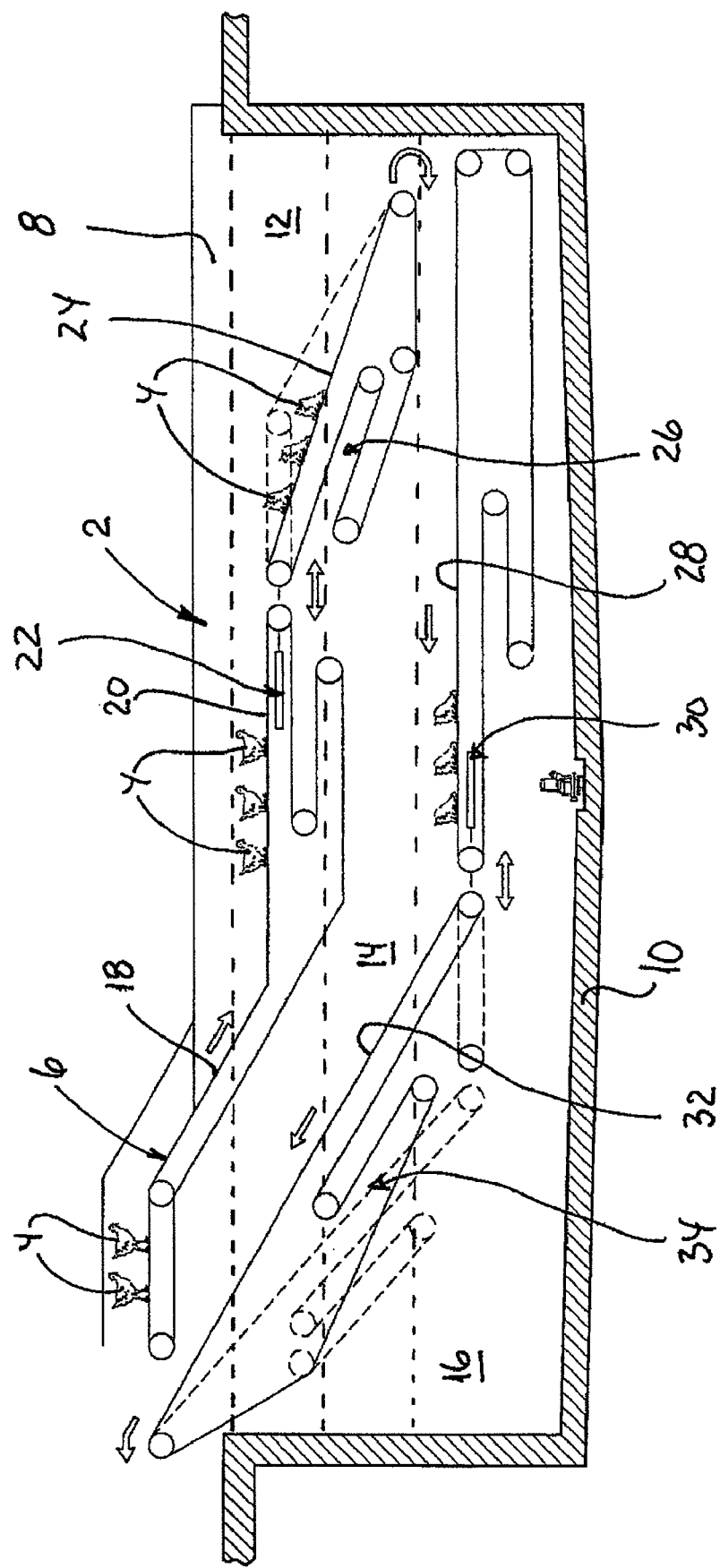
FIG. 1 shows a longitudinal sectional view, partially in section, through an embodiment of a system for gas stunning of poultry for slaughter according to the invention.

The system 2 shown in FIG. 1 for gas stunning of poultry for slaughter comprises a supply conveyor (not shown) for supply of poultry, which for example arrives at the slaughterhouse by truck, and which have been taken out of any transport crates before they arc transferred to the stunning system 2. The poultry 4 is transferred successively to a stunning conveyor 6 which actually is a system of endless conveyors having a number of sections running downwards into a stunning chamber 8, the major part of which is a concrete pit 10 lowered in relation to the floor level, which chamber is filled with stunning gas, for example $CO_2$ with varying gas concentrations, namely, an upper or first zone 12 having a gas concentration of approximately 5% to approximately 8%-10%, an intermediate or second zone 14 having a gas concentration of approximately 25% to approximately 32%-46%, and a lower and third zone 16 having a gas concentration of approximately 45-51%.

The gas concentration in the zones 12, 14, 16 can be further varied according to requirements, for example in relation to bird size or type. The gas concentration in the respective zones is controlled by suitable gas sensors and an actually known gas filling/control system with filling valves.

From the stunning conveyor 6, the poultry 4 is successively conveyed into a downwards running conveyor section 18, which continues into a horizontal conveyor section 20, whose active length can be varied by means of a telescopic system 22. From the conveyor section 20 the poultry 4 is transferred to a downwards running conveyor section 24 whose active length can be varied by means of a telescopic system 26 which interacts with the telescopic system 22 for the conveyor section 20. From the conveyor section 24 the poultry 4, which by now is stunned, is conveyed onto a horizontally running conveyor 28 whose active conveying route length also can be varied by means of a telescopic system 30. The stunned poultry 4 is then conveyed upwards and out from the stunning chamber 8 by an upwards running conveyor 32, which, and for being able to interact with the conveyor 26, also comprises a telescopic system 34 for variation of the active conveying route length of the conveyor 28.

From the conveyor 32 the stunned poultry are transferred to an external conveyor for being shackled on a slaughtering line. Shortly after the stunned chickens have been shackled by their legs in slaughter shackles, the chickens pass a slaughter location where their necks are cut so that the chickens bleed out as a result of the pumping function of their hearts still being intact if the gas stunning is optimum.

If it is determined that the gas stunning either is too great, that is the chickens are already dead, the stunning must be adjusted by shortening the conveying route and/or the conveying time through the stunning chamber so that the stunning becomes less. If the chickens on the contrary show signs of too little stunning, the stunning must likewise be adjusted so that the conveying route and/or the conveying time through the stunning chamber is increased.

In both situations, adjustment can be effected by reducing or prolonging the conveying time and/or by changing the active conveying route lengths of the conveyors 20, 24, 28, 32 by means of the telescopic systems 22, 26, 30, 34.

Sensors in given locations ensure that the respective conveyors are in correct positions, for example for small, medium-sized, or large chickens. An important thing which also influences the stunning result is that the poultry 4 is stepped downwards, starting in a low gas concentration of Approximately 5%-10%. The step by step downwards conveying ensures that the chickens upon starting and stopping lift their heads whereby they can freely breathe in the relatively low gas concentration. This prevents the poultry from becoming stressed, and injuries are avoided.

To reduce or prolong the conveying time through the stunning chamber 8, it is of course also possible to adjust the speed of the respective conveyors.

After the first part of the downwards movement, the poultry has "fallen asleep" and this continues further down where the gas concentration is max. 50% at the bottom of the chamber. Hereby it is ensured that the chickens will not wake up before their necks have been cut and they have bled out. Furthermore, regarding safety, it is an advantage to lower the stunning chamber below the floor level so that gas leakage above height of the head an operator is avoided.

Figure 2:
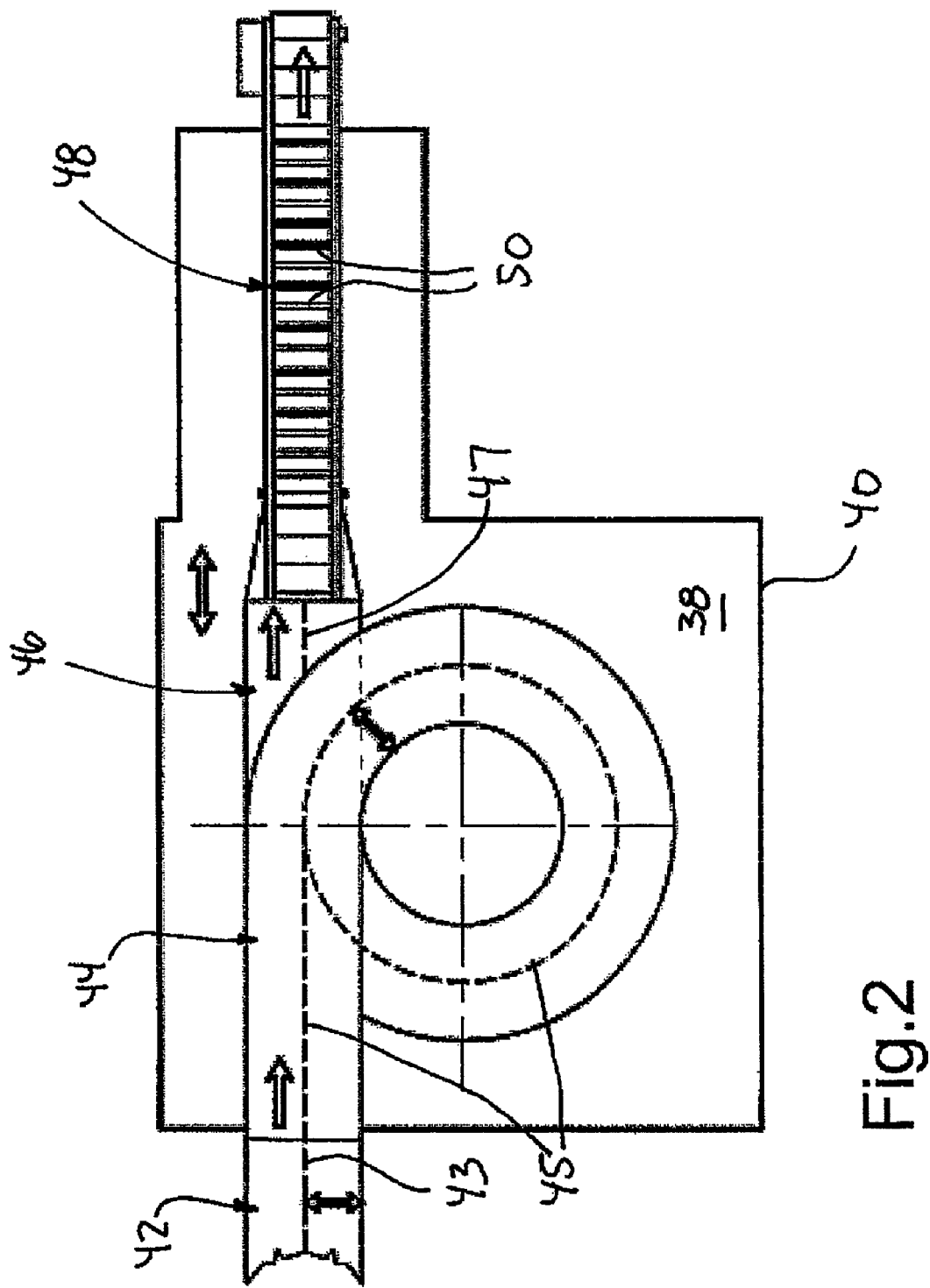
FIG. 2 shows a top view of another embodiment of a system for gas stunning of poultry for slaughter.

The system 36 outlined in FIG. 2 comprises a stunning chamber 38 which like the system 2 (FIG. I) described above comprises a concrete pit 40 lowered in relation to floor level. After unloading, poultry is transferred to the stunning chamber 38 via a horizontal supply conveyor 42 delivering the birds to a downwards running helical conveyor 44 which at the bottom of the stunning chamber 38 again delivers the now stunned birds to a horizontal, telescopic conveyor 46 from which the stunned birds are transferred to an upwards running conveyor 48 which conveys the stunned birds upwards and out of the stunning chamber 38 for further conveyance to shackling on a slaughtering line, etc.

The conveyors 42, 44, 46 have relatively large widths of for example Approximately 800 mm each, that is at a given speed, the capacity of these conveyors is large. In a simple manner the width of the conveyors 42, 44, 46 and thus their capacity can be reduced by means of laterally displaceable walls 43, 45, 47. By this lateral displacement of the walls 43, 45, 47 the conveying route length is moreover varied in that the length of the helical conveyor is prolonged by forcing the poultry outwards in the curve and oppositely, by forcing the poultry inwards in the curve.

Alternatively, the capacity of the cooperating conveyors 42, 44, 46 can be varied by varying the conveying speed or the conveying route length in that the number of "twists" of the helical conveyor 44 can be adjusted to the actual conveying need, just as the active length of the telescopic conveyor 46 can be varied. In this connection, it should be mentioned that the slanting position of the upwards running conveyor also can be adjusted. The upwards running conveyor is provided with transversely positioned carriers 50 which, if the conveyor 48 has a very steep course, can be replaced by cups so that the stunned birds will surely be conveyed upwards and out of the stunning chamber 38.

The invention claimed is:

1. A method for stunning poultry for slaughter with a stunning gas comprising:
conveying the poultry successively through a stunning chamber, wherein an influence of the stunning gas of the poultry is adjusted by increasing or reducing an active length of at least one conveyor conveying the poultry within the stunning chamber.

2. A method according to claim 1 wherein the influence of the stunning gas is adjusted by increasing or reducing a time of conveying the poultry exposed to the stunning gas within the stunning chamber.

3. A method according to claim 2, wherein the increasing or reducing the time of conveying the poultry through the stunning chamber includes increasing or reducing a speed of the at least one conveyor conveying the poultry through the stunning chamber.

4. A method according to claim 1, wherein the influence of the stunning gas is also adjusted by varying a concentration of the stunning gas at varying levels within the stunning chamber through which the at least one conveyor moves with the stunning gas concentration increasing in a downwards direction of movement of the poultry along the at least one conveyor in the stunning chamber.

5. A method according to claim 2, wherein the influence of the stunning gas is also adjusted by varying a concentration of the stunning gas at varying levels within the stunning chamber through which the at least one conveyor moves with the stunning gas concentration increasing in a downwards direction of movement of the poultry along the at least one conveyor in the stunning chamber.

6. A method according to claim 3, wherein the influence of the stunning gas is also adjusted by varying a concentration of the stunning gas at varying levels within the stunning chamber through which the at least one conveyor moves with the stunning gas concentration increasing in a downwards direction of movement of the poultry along the at least one conveyor in the stunning chamber.

7. A system for stunning of poultry for slaughter with a stunning gas comprising at least one conveyor for receiving and introducing poultry for slaughtering to, through and out of a stunning chamber containing the stunning gas in which at least one downwards running conveyor and at least one upwards running conveyor is disposed for conveying the poultry through the stunning chamber, the at least one downwards running conveyor successively conveying the poultry downwards in the stunning chamber, and the at least one upwards running conveyor successively conveying the poultry upwards with the stunning chamber, wherein the at least one downwards and the at least one upwards running conveyor providing adjustment of an active length of conveying the poultry within the stunning chamber to vary an influence of the stunning gas on the poultry while within the stunning chamber.

8. A system in accordance with claim 7, wherein:
the at least one of the downwards running conveyor includes a downwards running course and the at least one upwards running conveyor includes an upwards running course which adjust the active length of conveying of the poultry through the stunning chamber.

9. A system in accordance with claim 7 comprising:
at least one horizontal conveyor including a horizontal course providing adjustment of the active length of conveying the poultry through the stunning chamber.

10. A system in accordance with claim 8 comprising:
at least one horizontal conveyor including a horizontal course providing adjustment of the active length of conveying the poultry through the stunning chamber.

11. A system in accordance with claim 9 comprising:
At least one horizontal conveyor including a horizontal course providing adjustment of the active length of conveying the poultry through the stunning chamber.

12. A system in accordance with claim 7 wherein:
the at least one of the downwards running conveyor and the upwards running conveyor comprises a helical conveyor interacting with at least one horizontal conveyor to provide the poultry to the stunning chamber and to output the poultry from the stunning chamber.

13. A system according to claim 7, wherein the downwards and the upwards running conveyors comprise mutually interacting members which telescope to vary the active length.

14. A system according to claim 8, wherein the downwards and the upwards running conveyors comprise mutually interacting members which telescope to vary the active length.

15. A system according to claim 8, wherein the downwards and the upwards running conveyors comprise mutually interacting members which telescope to vary the active length.

16. A system according to claim 10, wherein the downwards, horizontal and upwards running courses comprise mutually interacting members which telescope to vary the actual length.

17. A system according to claim 7, wherein the stunning chamber is divided into zones which, during stunning, comprise a lower zone having a stunning gas concentration of approximately between 45% and 51%, an intermediate zone having a stunning gas concentration of between 25% and approximately 32% to 46%, and an upper zone having a stunning gas concentration of between 5% and approximately 8% to 10%, with sensors being provided for monitoring and controlling of the gas concentration in the zones.

18. A system according to claim 8, wherein the stunning chamber is divided into zones which, during stunning, comprise a lower zone having a stunning gas concentration of approximately between 45% and 51%, an intermediate zone having a stunning gas concentration of between 25% and approximately 32% to 46%, and an upper zone having a stunning gas concentration of between 5% and approximately 8% to 10%, with sensors being provided for monitoring and control of the gas concentration in the zones.

19. A system according to claim 9, wherein the stunning chamber is divided into zones which, during stunning, comprise a lower zone having a stunning gas concentration of approximately between 45% and 51%, an intermediate zone having a stunning gas concentration of between 25% and approximately 32% to 46%, and an upper zone having a stunning gas concentration of between 5% and approximately 8% to 10%, with sensors being provided for monitoring and control of the gas concentration in the zones.

20. A system according to claim 10, wherein the stunning chamber is divided into zones which, during stunning, comprise a lower zone having a stunning gas concentration of approximately between 45% and 51%, an intermediate zone having a stunning gas concentration of between 25% and approximately 32% to 46%, and an upper zone having a stunning gas concentration of between 5% and approximately 8% to 10%, with sensors being provided for monitoring and control of the gas concentration in the zones.

21. A system according to claim 12, wherein that the stunning chamber is divided into zones which, during stunning, comprise a lower zone having a stunning gas concentration of approximately between 45% and 51%, an intermediate zone having a stunning gas concentration of between 25% and approximately 32% to 46%, and an upper zone having a stunning gas concentration of between 5% and approximately 8% to 10%, with sensors being provided for monitoring and control of the gas concentration in the zones.

22. A system according to claim 13, wherein that the stunning chamber is divided into zones which, during stunning, comprise a lower zone having a stunning gas concentration of approximately between 45% and 51%, an intermediate zone having a stunning gas concentration of between 25% and approximately 32% to 46%, and an upper zone having a stunning gas concentration of between 5% and approximately 8% to 10%, with sensors being provided for monitoring and control of the gas concentration in the zones.

23. A system according to claim 14, wherein that the stunning chamber is divided into zones which, during stunning, comprise a lower zone having a stunning gas concentration of approximately between 45% and 51%, an intermediate zone having a stunning gas concentration of between 25% and approximately 32% to 46%, and an upper zone having a stunning gas concentration of between 5% and approximately 8% to 10%, with sensors being provided for monitoring and control of the gas concentration in the zones.

24. A system according to claim 15, wherein that the stunning chamber is divided into zones which, during stunning, comprise a lower zone having a stunning gas concentration of approximately between 45% and 51%, an intermediate zone having a stunning gas concentration of between 25% and approximately 32% to 46%, and an upper zone having a stunning gas concentration of between 5% and approximately 8% to 10%, with sensors being provided for monitoring and control of the gas concentration in the zones.

25. A system according to claim 10 comprising a PLC control system for controlling mutually dependent mechanical parameters including a speed of the at least one conveyors and speed of a slaughtering line which receives birds which have been stunned in the stunning chamber.

* * * * *